Sept. 20, 1932.  A. DEWANDRE  1,878,822
ELECTRICAL CONTROL FOR SERVO MOTORS
Filed Dec. 20, 1928   5 Sheets-Sheet 1

Inventor
A. Dewandre
By
his Atty

Sept. 20, 1932.   A. DEWANDRE   1,878,822
ELECTRICAL CONTROL FOR SERVO MOTORS
Filed Dec. 20, 1928   5 Sheets-Sheet 3

Inventor
A. Dewandre
by
his Atty.

Sept. 20, 1932.  A. DEWANDRE  1,878,822
ELECTRICAL CONTROL FOR SERVO MOTORS
Filed Dec. 20, 1928   5 Sheets-Sheet 4

Sept. 20, 1932.   A. DEWANDRE   1,878,822
ELECTRICAL CONTROL FOR SERVO MOTORS
Filed Dec. 20, 1928   5 Sheets-Sheet 5

Inventor
A. Dewandre
By [signature]
His Atty

Patented Sept. 20, 1932

1,878,822

UNITED STATES PATENT OFFICE

ALBERT DEWANDRE, OF LIEGE, BELGIUM

ELECTRICAL CONTROL FOR SERVO-MOTORS

Application filed December 20, 1928, Serial No. 327,271, and in Belgium October 6, 1928.

Applications for patent have been made in the following countries: Belgium, October 6th, 1928; France, November 5th, 1928; Germany, November 6th, 1928; Great Britain, November 12th, 1928, of which the following is a specification:

This invention is directed to an electrical control of a servo-motor of the type responsive to pressure differences of a motive fluid.

The essential requirements of a servo-motor control must be subjective to a manual government which requires the maximum range of selective manipulation on the part of the operator, for otherwise a selective possibility on the part of the operator will frequently result in an undesirable servo-motor operation and the ideal condtion of such a selective control is where the operator is called upon to make but a single movement to carry out any possible option at his control, the selected option being performed by the degree of such single movement.

Therefore, the present invention is directed to the provision of an electric control for the operation of a servo-brake governed by pressure differences, with such control capable of a minimum sustained servo-motor operation; a gradually increasing servo-motor operation, with such servo-motor operation capable of interruption at any point; or an uninterrupted maximum operation of such servo-motor, with all such servo-motor controls inaugurated by an operative manual movement in one direction progressively governed to secure the selected servo-motor operation.

Figure 1:
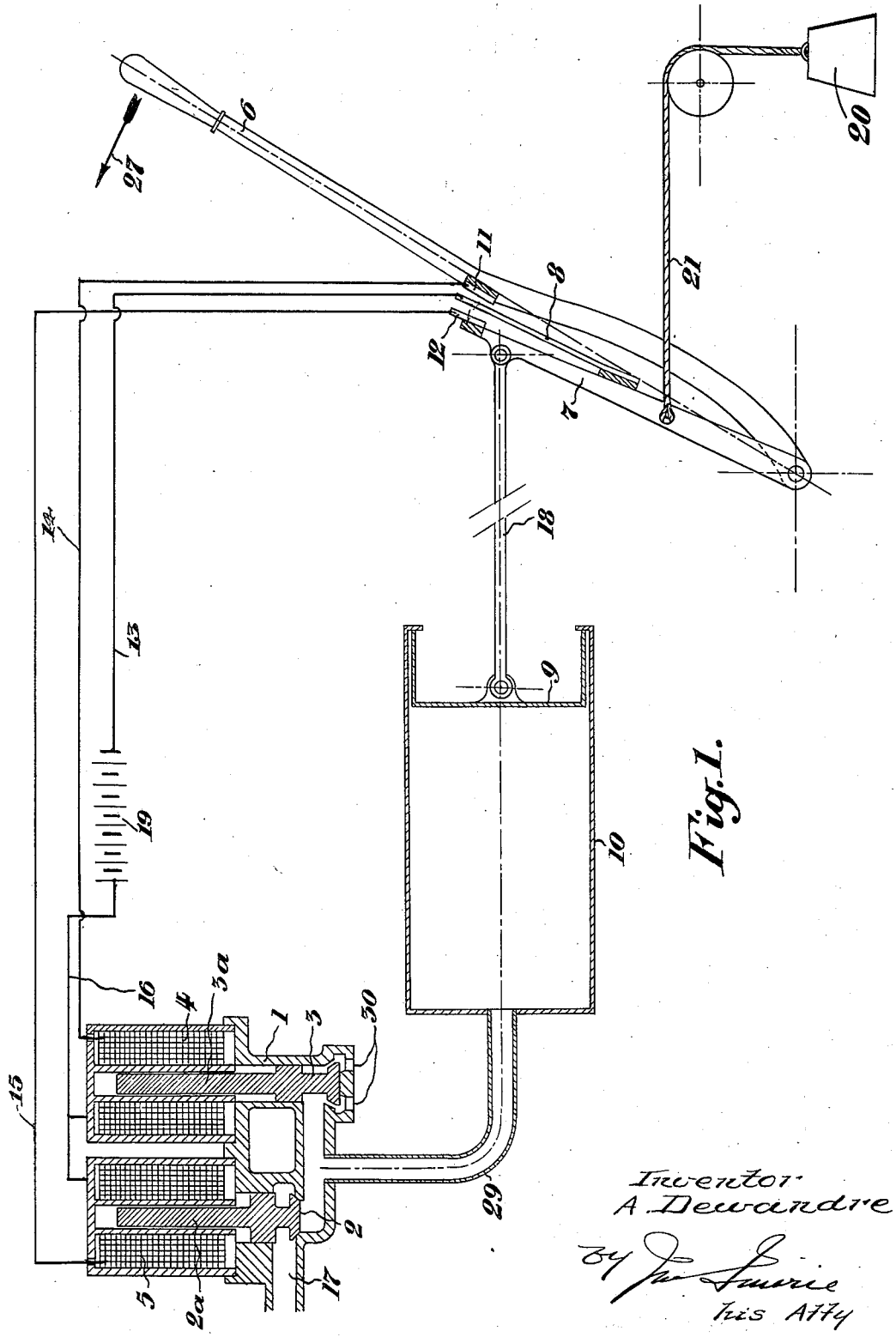
Fig. 1 is a diagrammatic view of a general arrangement of the device by means of which the distributing members of a servo motor working on a decompressed fluid are operated electrically from a distance, the device being shown in the position of rest with the valve communicating with the atmosphere open and the valve communicating with the source of partial vacuum closed.

In Figs. 1, 2, 3 and 5 the arrangement comprises a cylinder and piston power unit, a distributor with two valves and a group of two levers, one of which can be actuated by hand and the other of which is connected to the piston of the servo-motor.

In the following description the first valve will be called the pressure difference valve according as the power fluid employed is decompressed or compressed, and the second the pressure equalizing valve.

The distributor is composed of a body 1 in which are arranged the pressure difference valve 2 and pressure equalizing valve 3 operated by electromagnets 5 and 4 respectively.

The group of control levers comprises an operating member in the form of a lever 6 actuated by the operator and a lever 7 connected at one point to the piston 9 of the cylinder 10 by a rod 18 and at another point to the receiving member or driven member 20 by means of a suitable transmission represented by a cable 21.

To the lever 7 is fitted with electrical insulation a spring blade 8 forming a contact member with contacts 11 and 12 mounted with electrical insulation upon the levers 6 and 7 respectively.

The contacts 11 and 12 are connected, by conductors 14 and 15 respectively, to one of the terminals of the electromagnets 4 and 5, while the elastic contactor 8 is connected to one of the poles of a battery 19, the other pole of which is connected to the other terminal of these two electromagnets.

In the diagrammatic Figures 1, 2, 3 and 5, the stems $2_a$, $3_a$ of the valves 2 and 3 form the movable cores of the two electromagnets.

In the state of rest, the valve 2 is kept closed and the valve 3 is kept open, each under the action of its own weight, to which is added preferably the action of a spring. Such springs are shown at 23 and 24 (Fig. 4).

Figure 4:
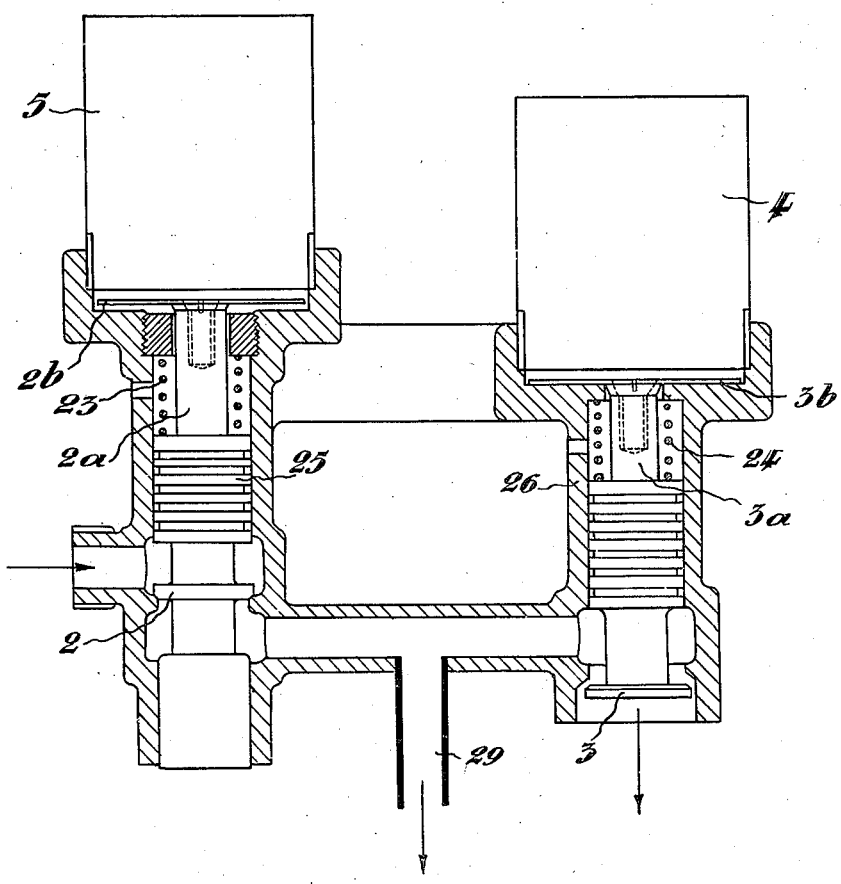
Fig. 4 shows a practical embodiment of the distributor comprising the two valves.

In the practical embodiment of the distributor shown in this Fig. 4, the stems $2_a$ and $3_a$ of the valves 2 and 3 carry at their end a plate $2_b$, $3_b$ forming the armature of the electromagnets 4 and 5. These stems slide in a fluid tight manner in guides 25, 26. They are balanced to the pressure surrounding them.

In the case when a decompressed power fluid is employed (Figs. 1, 2 and 3), the operation of the servo motor takes place in the following manner.

When the operator, starting from the position shown in Fig. 1, moves the lever 6 in the direction of the arrow 27, the contact 11 meets the blade 9 and closes the circuit of the electromagnet 4, the effect of which is to return the valve 3 to its seating, thus closing the communication between the cylinder 10 and the atmosphere through the orifice 30 and the duct 29.

By continuing to move the lever 6, the blade 8 is brought on to the contact 12 of the lever 7, thus closing the circuit of the electromagnet 5 which then raises the valve 2 in order to establish communication between the cylinder 10 and the source of partial vacuum through the ducts 17 and 29.

As a result of the partial vacuum which is then established in the cylinder 10 the atmospheric pressure pushes the piston towards the left, the effect of which is to carry along the lever 7 and the resisting driven member 20.

If the lever 6 is locked in a determined position the piston 9 will continue its movement because the partial vacuum lever 2 remains open until the contact 12 is no longer in contact with the blade 8, that is to say until the circuit of the electromagnet 5 is open, the valve 2 then falling back on to its seating and closing the communication between the cylinder and the source of partial vacuum, the effect of which will be to lock the piston 9, the lever 7 and the driven member 20 in the position occupied at this moment.

If the lever 6 is locked in a new position after having again brought the blade 8 into contact with the contact 12 the valve 2 will again open, the partial vacuum in the cylinder 10 will increase and the piston 9 will continue to advance towards the left, carrying along the lever 7 and the resisting member 20 until the moment when the blade 8 ceases to touch the contact 12, the valve 2 then closing automatically and again cutting the cylinder 10 off from communication with the source of partial vacuum.

The piston 9, the lever 7 and the driven member 20 again become locked and so on for each position given to the lever 6.

For each position in which the lever 6 is locked there will therefore correspond a determined position of the piston 9 and the driven member 20, that is to say there will be a complete subordination of the system controlling the partial vacuum motor.

If, as a result of a leakage at the cylinder or at the air inlet valve 3 the piston 9, which had moved towards the left, tends to return towards the right, the lever 7 would follow its movement and would again bring the contact 12 into contact with the blade 8, thus closing the circuit of the electromagnet 5, which would cause the partial vacuum valve to open, the effect of which would be to return the piston 9 towards the left until the contact between the blade 8 and the contact 12 was broken, that is to say until the said piston had returned into the position corresponding to that of the lever 6.

For a determined position given to the lever 6 the partial vacuum in the cylinder will therefore remain constant in spite of leakages.

In order to reduce the value of this partial vacuum slightly with a view to returning the piston slightly towards the right it is sufficient to move the lever 6 back towards the right so as to break the contact between the blade 8 and the contact 11, the effect of which will be to open the circuit of the electromagnet 4 and consequently to open the valve 3, thus permitting an instantaneous admission of air into the cylinder 10. This piston thus returns towards the right at the same time as the lever 7, until the blade 8 is brought back into contact with the contact 11, the effect of which is to close the valve 3 and stop the admission of air into the cylinder where the partial vacuum is then maintained at a lower value, the piston being locked in its new position corresponding to that given to the lever 6.

In order to make the action of the partial vacuum upon the piston cease completely and return the latter into the position of rest, it is sufficient to bring the lever 6 back into the position shown in Fig. 1, the effect of which is to open the atmospheric valve 3 and close the partial vacuum valve 2.

Figure 5:
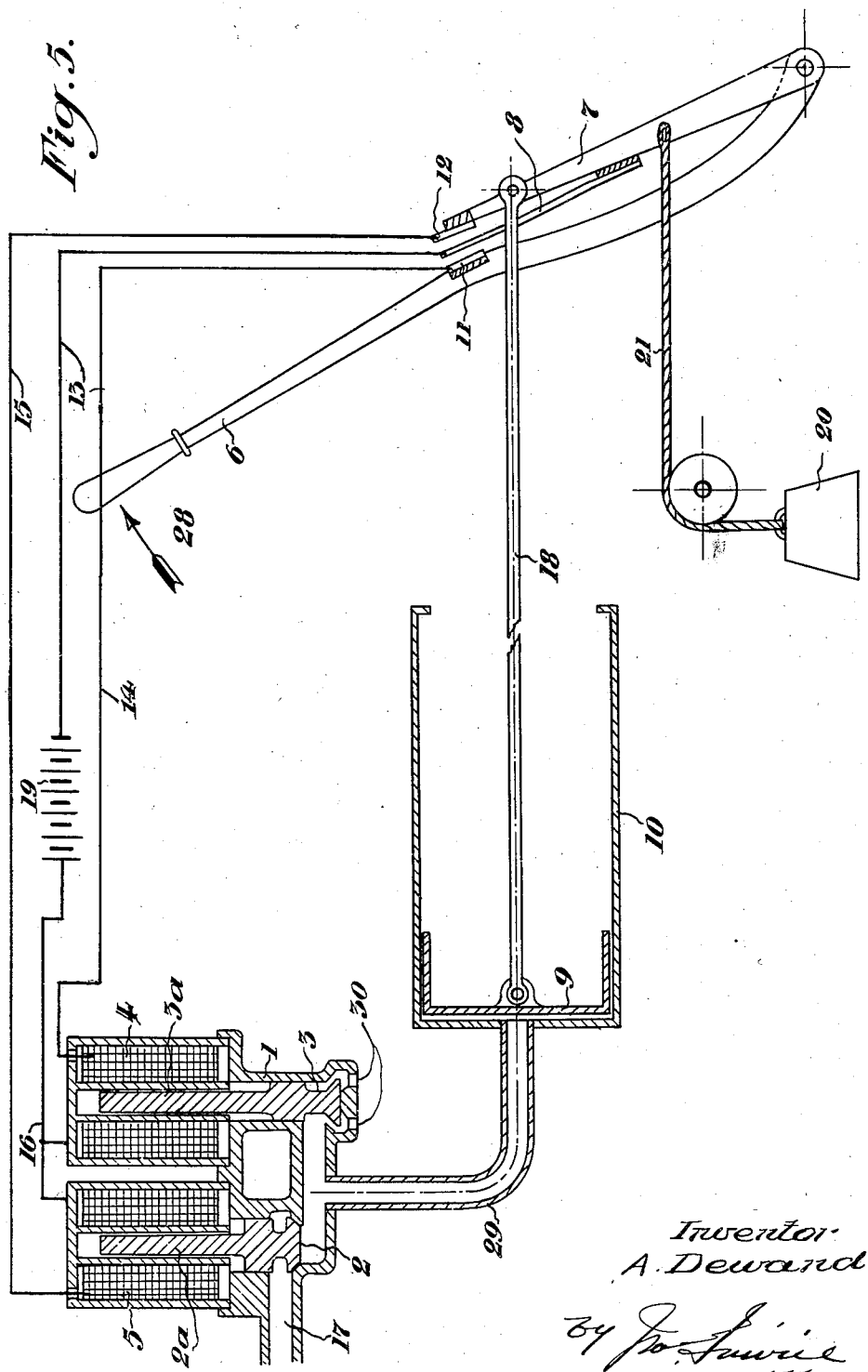
Fig. 5 shows an analogous arrangement to that shown in Fig. 1 in the position of rest for the case when the servo motor is actuated by a fluid under pressure.

The arrangement shown diagrammatically in Fig. 5 is applicable to the case when the power fluid employed is compressed.

Figure 2:
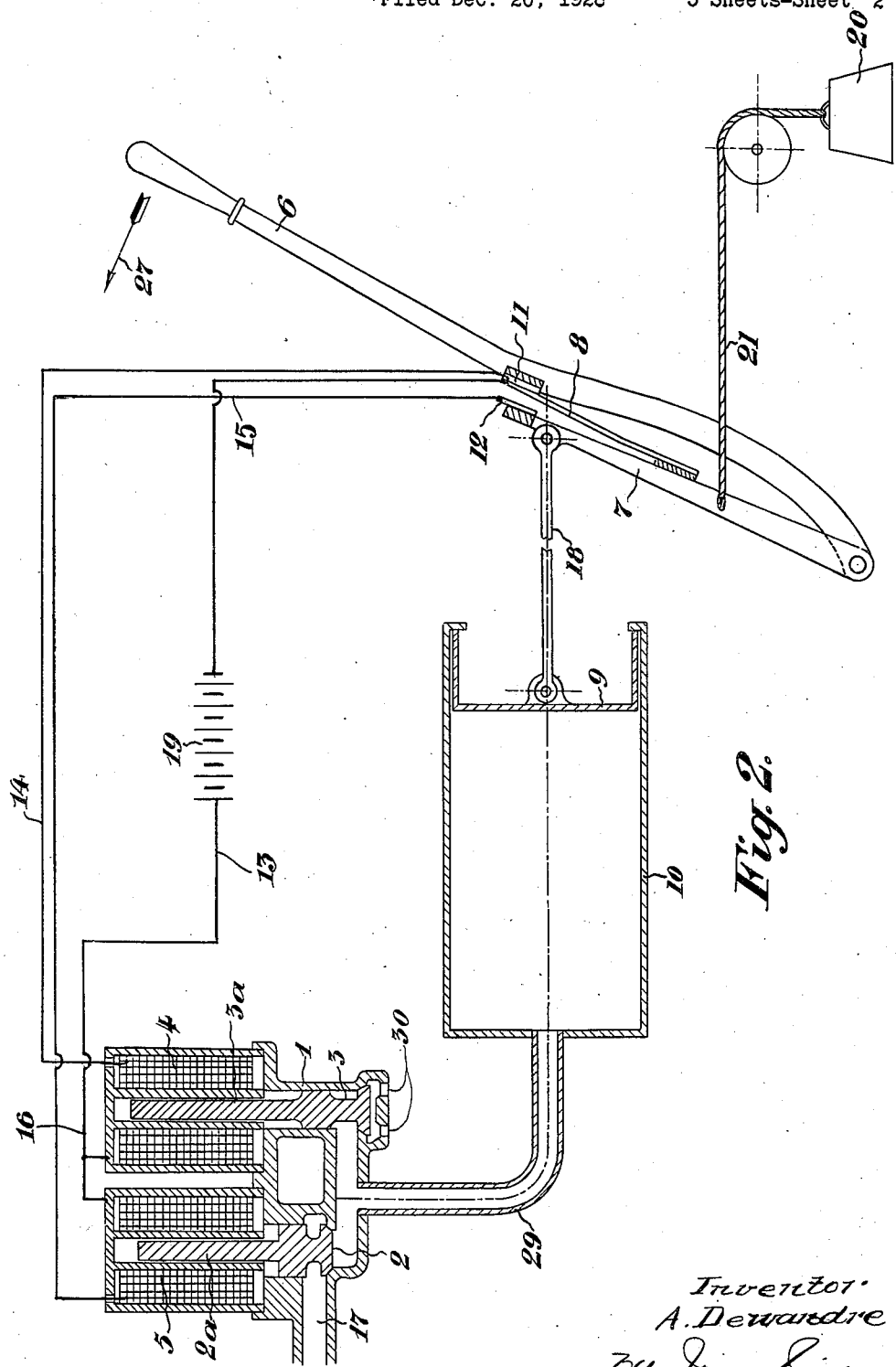
Fig. 2 shows the same arrangement in the position in which the two valves are closed.
Figure 3:
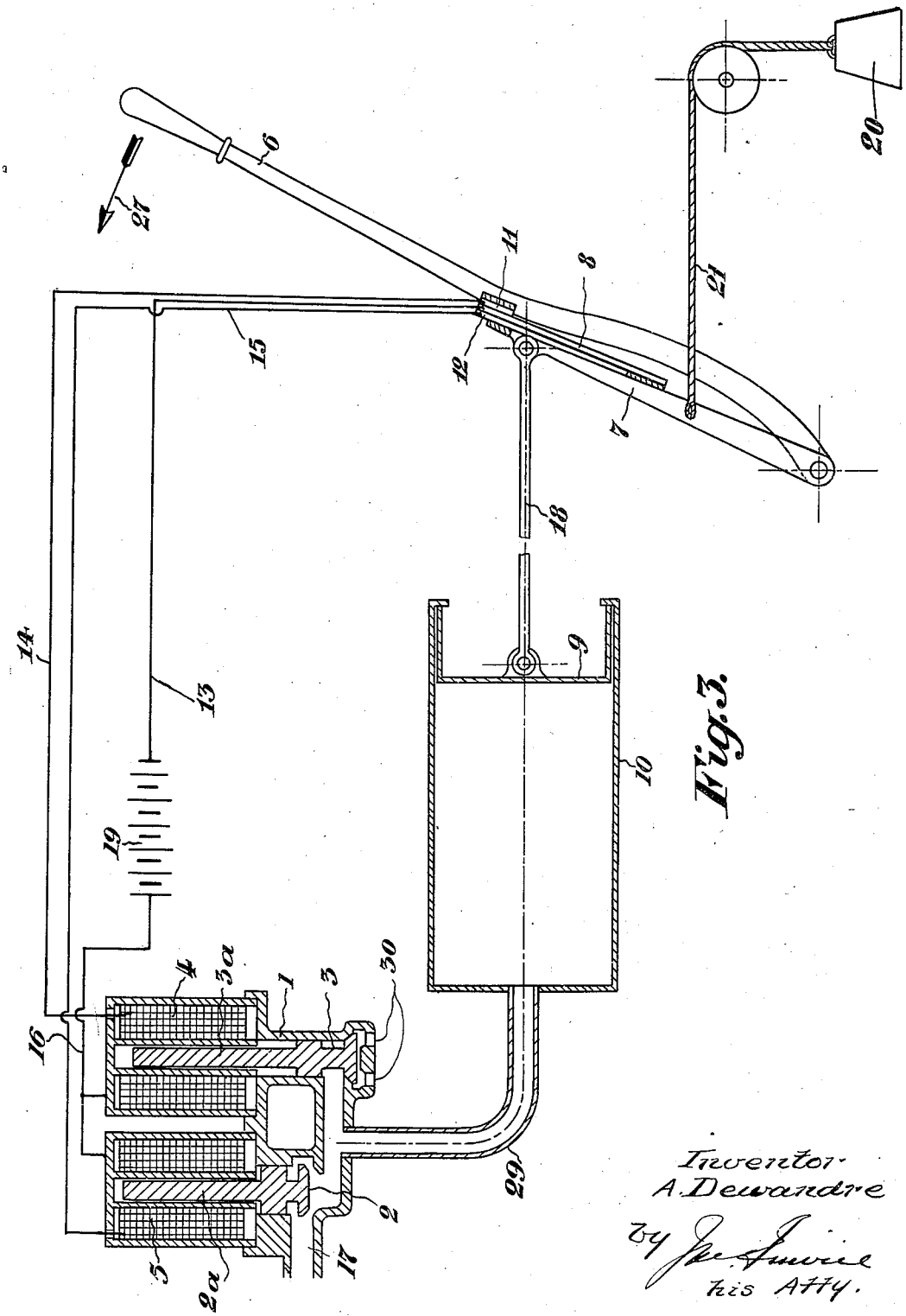
Fig. 3 shows this arrangement in the position in which the second valve only is opened.

It is to be noted in this case that the position of the lever 7 is reversed relatively to the lever 6 the movement of which is effected in the direction of the arrow 28 and therefore in an opposite direction to the direction of movement in Figs. 1 to 3.

The fact that each of the valves 2 and 3 is balanced permits the effort required of the electromagnets, that is to say the current consumption, to be reduced to a minimum.

It will be understood that a servo motor in which the subordinate action is thus controlled can operate with a graduated action in both directions with as completely progressive an action as desired.

The invention is adapted for use with servo motors controlling the trap doors of silos, the brakes of extracting machines, motor vehicle brakes, automotive machines, etc.

It is not limited to the control of the subordinated action of servo motors operating on a pneumatic fluid. It is adapted to be applied to hydraulic and electrical servo motors.

It may be employed for engaging and disengaging a movement transmitting arrangement and reversing its direction of movement.

What I claim is:

1. An electric control for servo-motors of the type wherein an operating member is caused to perform work as the result of pressure differences on said member, including an equalizing valve for de-energizing the servo-motor, a pressure difference valve for energizing the servo-motor, electrical means including normally open circuits for operating the valves, and relatively movable lever operating members adapted to successively close these circuits by virtue of the relative movement of the members.

2. An electric control for servo-motors of the type wherein an operating member is caused to perform work as the result of pressure differences on said member, including a pressure equalizing valve for de-energizing the servo-motor, a pressure difference valve for energizing the servo-motor, electrical means for operating the valves including normally open circuits, and relatively movable lever members acting progressively by virtue of their relative movement to successively close the circuit for controlling the pressure equalizing valve and the circuit for closing the pressure difference valve.

3. An electric control for servo-motors of the type wherein an operating member is caused to perform work as the result of pressure differences on said member, including a normally open pressure equalizing valve for de-energizing in the servo-motor, a normally closed pressure difference valve for controlling the generation of pressure differences for energizing the servo-motor, electrical means for each of said valves serving when energized to close the pressure equalizing valve and to open the pressure difference valve, and a manually operable lever member acting to successively energize the electrical means for the pressure equalizing valve and the electrical means for the pressure difference valve in succession.

4. An electric control for servo-motors of the type wherein an operating member is caused to perform work as the result of pressure differences on said member, including a normally open pressure equalizing valve for de-energizing the servo-motor, a normally closed pressure difference valve for controlling the generation of pressure differences for energizing the servo-motor, electrical means for each of said valves serving when energized to close the pressure equalizing valve and to open the pressure difference valve, a manually operable member acting to energize the electrical means for the pressure equalizing valve and the electrical means for the pressure difference valve in succession, and means whereby the pressure difference valve electrical means is controlled by the servo-motor following cessation of movement of the operating member.

5. An electric control for servo-motors of the type wherein an operating member is caused to perform work as the result of pressure differences on said member, including a normally open pressure equalizing valve for de-energizing the servo-motor, a normally closed pressure difference valve for controlling the generation of pressure differences for energizing the servo-motor, electrical means for each of said valves serving when energized to close the pressure equalizing valve and to open the pressure difference valve, a manually operable lever member acting to energize the electrical means for the pressure equalizing valve and the electrical means for the pressure difference valve in succession, and means including spaced apart relatively movable elements operated by the operating element of the servo-motor following limited movement of the operating lever member to de-energize the electrical means controlling the pressure difference valve for interrupting the pressure difference influence on said operating member.

6. An electric control for servo-motors of the type wherein an operating member is caused to perform work as the result of pressure differences on said member, including a normally open pressure equalizing valve for the servo-motor, a normally closed pressure difference valve for the servo-motor, an electro-magnet for each valve acting when energized to reverse the normal condition of the valve, a normally open circuit for each electro-magnet, a switch element common to said circuits, a manually operable member, a contact for one of the circuits carried by said member, and a contact for the other of said circuits connected with the operating element of the servo-motor, said manually operable member operating to close said circuits in succession during a progressive movement of the latter member in one direction.

7. An electric control for servo-motors of the type wherein an operating member is caused to perform work as the result of pressure differences on said member, including a normally open pressure equalizing valve for the servo-motor, a normally closed pressure difference valve for the servo-motor, an electro-magnet for each valve acting when energized to reverse the normal condition of the valve, a normally open circuit for each electro-magnet, a switch element common to said circuits, a manually operable member, a contact for one of the circuits carried by said latter member, and a contact for the other of said circuits connected with the operating element of the servo-motor, said manual operating member operating to close said circuits in succession in a progressive movement of the member in one direction, the contact controlled by the operating element of the servo-motor being actuated to open the circuit governed by said contact following a predetermined movement of the servo-motor operating element.

8. An electric control for servo-motors of the type wherein an operating member is caused to perform work as the result of pressure differences on said member, including a normally open pressure equalizing valve, a normally closed pressure difference valve, an electro-magnet for each valve serving when energized to reverse the normal positions of the valves, a normally open circuit for each electro-magnet, an operating member, a contact for one of the circuits carried by said member, a lever controlled by the operating element of the servo-motor, a contact for the other of said circuits carried by said lever, and a contact common to both circuits interposed between said first mentioned contacts, the respective contacts being successively brought into circuit closing relation through a progressive movement of the second-mentioned operating member.

9. An electric control for servo-motors of the type wherein an operating member is caused to perform work as the result of pressure differences on said member, including a normally open pressure equalizing valve, a normally closed pressure difference valve, an electro-magnet for each valve serving when energized to reverse the normal positions of the valves, a normally open circuit for each electro-magnet, an operating member, a contact for one of the circuits carried by said member, a lever controlled by the operating element of the servo-motor, a contact for the other of said circuits carried by said lever, and a contact common to both circuits interposed between said first mentioned contacts, the respective contacts being successively brought into circuit closing relation through a progressive movement of the operating member, the lever in the movement of the operating element of the servo-motor serving to automatically move the contact carried thereby out of circuiting relation with the common contact in a predetermined movement of said operating element following a limited movement of the operating member.

10. An electric control for servo-motors including electric responsive means for controlling pressure equalization in the motor, electric responsive means for controlling the creation of pressure differences in the motor, a circuit for each of said electric responsive means, a manually operable member movable in one direction for first closing the circuit to govern the electric responsive means for controlling pressure equalization and then close the circuit for governing the electric responsive means for controlling the creation of pressure differences, and means for breaking the circuit governing the electro-responsive means for controlling the creation of pressure differences by servo-motor actuation independently of the manually operable member.

11. An electric control for servo-motors including electric responsive means for maintaining equalization of pressures in said motor, electric responsive means to control pressure differences in said motor to cause motor operation, a circuit for each of said electric responsive means, a manually operable member for controlling said circuits successively in the progressive movement of the member, and means responsive to servo-motor operation for controlling one of said circuits independently of the manually operable member without interfering with the further control of said circuit by the manually operable member in a further progressive movement of the latter.

12. An electric control for servo-motors including electric responsive means for governing pressure equalization in said motor, electric responsive means for governing pressure differences in said motor for energizing the motor, a normally open circuit for each of said electric responsive means, and a manually operable element acting in progressive movement in one direction to successively close said circuits, one of the circuits being opened by and in the operation of the servo-motor, the said opened circuit being arranged to be again closed on a further progressive movement of the manually operable member.

13. An electric control for servo-motors including electric responsive means for controlling a vent from the motor to maintain equalized pressures therein, electric responsive means for controlling the creation of pressure differences in said motor for energizing the motor, a normally open circuit for each of said electric responsive means, a manually operable member for initially closing the circuit controlling the electric responsive means for governing the vent from the motor, said manually operable member in further progressive movement in the same direction closing the circuit for the electric responsive means for controlling the pressure differences in the motor, and a connection from the servo-motor for opening the circuit of the electro-responsive means for controlling the pressure differences to the motor without interfering with the further closing of said opened circuit in a further movement of the manually operable member in the same direction.

14. An electric control for servo-motors including a normally open valve for venting the motor to the atmosphere, a normally closed valve for governing the admission of suction to the motor for energizing the latter, electric responsive means including a normally open circuit for closing the vent controlling valve, electric responsive means including a normally open circuit for opening the valve controlling the suction, a manually operable member serving in progressive movement in one direction to first close the circuit controlling the electric responsive means for the vent valve and thereafter close the circuit for the electric responsive means for controlling the suction valve, and means operated by the servo-motor for opening the circuit for the electric responsive means for controlling the suction valve.

15. An electric control for servo-motors including a normally open valve for venting the motor to the atmosphere, a normally closed valve for governing the admission of suction to the motor for energizing the latter, electric responsive means including a normally open circuit for closing the vent controlling valve, electric responsive means including a normally open circuit for opening the valve controlling the suction, a manually operable member serving in progressive movement in one direction to first close the circuit controlling the electric responsive means for the vent valve and thereafter close the circuit for the electric responsive means for controlling the suction valve, and means operated by the servo-motor for opening the circuit for the electric responsive means for controlling the suction valve, the circuit opened by the servo-motor being capable of being closed by the manually operable member on further movement of said member in the original direction.

16. An electric control for servo motors including a normally open vent valve for equalizing pressures within the motor, a normally closed suction valve for creating pressure differences within the motor, an electric responsive means including a normally open circuit for each of said valves, the electric responsive means for the vent valve serving when energized through the closing of its circuit to close the vent valve, the electric responsive means for the suction valve serving when energized through closing of its circuit to open the suction valve, a manually operable member operating under progressive movement in one direction to first close the circuit of the electric responsive means of the vent valve and then close the circuit for the electric responsive means of the suction valve, and means operated by the servo-motor in actuation to open the circuit for the electric responsive means of the suction without interfering with the circuit for the control of the electric responsive means for the vent valve.

17. An electric control for servo-motors including a normally open vent valve for equalizing pressures within the motor, a normally closed suction valve for creating pressure differences within the motor, an electric responsive means including a normally open circuit for each of said valves, the electric responsive means for the vent valve serving when energized through the closing of its circuit to close the vent valve, the electric responsive means for the suction valve serving when energized through closing of its circuit to open the suction valve, a manually operable member operating under progressive movement in one direction to first close the circuit of the electric responsive means of the vent valve and then close the circuit for the electric responsive means of the suction valve, and means operated by the servo-motor in actuation to open the circuit for the electric responsive means of the suction without interfering with the circuit for the control of the electric responsive means for the vent valve, the manually operable member on further progressive movement in the same direction acting to again close the circuit opened by the servo-motor in actuation.

18. An electric control for servo-motors including a normally open atmospheric vent for the motor, electric responsive means for closing said vent, a normally closed power admission for the motor, electric responsive means for opening the power admission, a circuit for each of said electric responsive means, a manually operable member moving in one direction to first close the vent controlling circuit and then close the power controlling circuit, and means responsive to servo-motor actuation under the power means to break the power circuit independently of the manually operable member.

In witness whereof I affix my signature.
ALBERT DEWANDRE.